United States Patent
Hsu et al.

(10) Patent No.: US 9,866,817 B2
(45) Date of Patent: Jan. 9, 2018

(54) CAMERA MODULE

(71) Applicant: TDK TAIWAN CORP., Yangmei Taoyuan (TW)

(72) Inventors: Chen-Er Hsu, Yangmei Taoyuan (TW); Chih-Wei Weng, Yangmei Taoyuan (TW); Chao-Chang Hu, Yangmei Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 0 days.

(21) Appl. No.: 15/013,677

(22) Filed: Feb. 2, 2016

(65) Prior Publication Data
US 2016/0381346 A1 Dec. 29, 2016

(30) Foreign Application Priority Data

Jun. 23, 2015 (TW) ............................. 104120104 A

(51) Int. Cl.
*H04N 5/232* (2006.01)
*H04N 5/225* (2006.01)
*H04N 13/02* (2006.01)

(52) U.S. Cl.
CPC ....... *H04N 13/0239* (2013.01); *H04N 5/2257* (2013.01); *H04N 5/23287* (2013.01); *H04N 13/0296* (2013.01)

(58) Field of Classification Search
CPC ........... H04N 13/0239; H04N 13/0296; H04N 5/23287; H04N 5/2257; H04N 5/2258; H04M 1/0264
See application file for complete search history.

(56) References Cited

U.S. PATENT DOCUMENTS

| 2008/0122923 | A1* | 5/2008 | Chang | H04N 5/2257 348/44 |
| 2009/0122179 | A1* | 5/2009 | Nomura | H04N 5/2257 348/340 |
| 2013/0033581 | A1* | 2/2013 | Woo | H04N 5/2251 348/47 |
| 2013/0278785 | A1* | 10/2013 | Nomura | H04N 5/23287 348/208.11 |

(Continued)

FOREIGN PATENT DOCUMENTS

| JP | 2008020543 A | 1/2008 |
| JP | 2011013425 A | 1/2011 |
| JP | 2014106274 A | 6/2014 |

OTHER PUBLICATIONS

Japanese Office Action dated Oct. 11, 2016, as issued in corresponding Japan Patent Application No. 2016-117309 (3 pages).

*Primary Examiner* — Jason Flohre
(74) *Attorney, Agent, or Firm* — Muncy, Geissler, Olds & Lowe, P.C.

(57) ABSTRACT

A camera module is provided. The camera module includes a number of camera assembles. Each of the camera assembles includes a lens unit and an electromagnetic driving unit. The electromagnetic driving unit includes at least one magnetic element for controlling the movement of the corresponding lens unit. The distance between two of the magnetic elements, which are closest to each other and respectively positioned in two of the camera assemblies, is greater than the distance between two of the light through holes, to which the two of the camera assemblies are arranged to correspond.

8 Claims, 12 Drawing Sheets

(56) References Cited

U.S. PATENT DOCUMENTS

| | | | | |
|---|---|---|---|---|
| 2014/0340536 A1* | 11/2014 | Scherling | ............... | H04N 5/232 |
| | | | | 348/208.8 |
| 2015/0172521 A1* | 6/2015 | Yasukochi | ........... | H04N 5/2257 |
| | | | | 348/373 |
| 2015/0370040 A1* | 12/2015 | Georgiev | ............. | H04N 5/2258 |
| | | | | 348/218.1 |
| 2016/0044250 A1* | 2/2016 | Shabtay | ............... | H04N 5/2257 |
| | | | | 348/240.3 |
| 2016/0127646 A1* | 5/2016 | Osborne | ............. | H04N 5/2251 |
| | | | | 348/208.2 |

* cited by examiner

CAMERA MODULE

CROSS REFERENCE TO RELATED APPLICATIONS

This application claims priority of Taiwan Patent Application No. 104120104, filed on Jun. 23, 2015, the entirety of which is incorporated by reference herein.

BACKGROUND

Field of the Invention

The present invention relates to a camera module, and more particularly to a camera module with multiple lens units.

Description of the Related Art

Using conventional 3D photography techniques, images are captured through two lenses with a certain pitch, parallelism, and the same rotation/tilt angle (i.e., the same optical axis direction). Moreover, the recorded images are displayed to a user's right and left eyes via a special display device (such as 3D glasses).

Generally, as the pitch between the two lenses increases, images obtained by the two lenses are apparently different, which causes an increase in processing time for a processing system to process the image information, and the processed images are barely satisfactory. On the contrary, as the pitch between the two lenses decreases, images obtained by the two lenses are similar. Thus, the time required for processing the images is reduced. In addition, clear and sharp images can be obtained. However, for a camera module with dual lenses, if the pitch between the two lenses is less than a particular value, the two lenses may not operate normally (e.g., a failure of the OIS function) due to magnetic force interference. Therefore, how to set the ideal pitch between the two lenses without causing a failure of a predetermined operation is desired by manufacturers.

SUMMARY

To address the problems in the prior art, one of the objectives of the disclosure is to provide a camera module with at least two camera assemblies. By separating two of the neighboring camera assemblies with suitable pitches, the camera module is able to operate normally and process 3D images in a relatively short time.

In accordance with some embodiments of the disclosure, the camera module includes a plurality of camera assemblies. Each of the camera assemblies is configured to receive and detect light passing through one of the light guiding holes and includes a lens unit and an electromagnetic driving unit. The electromagnetic driving unit includes at least one magnetic element for controlling the movement of the lens unit. The distance between two of the magnetic elements, which are closest to each other and respectively positioned in a first and a second of the camera assemblies, is greater than the distance between two of the light through holes, to which the first and the second of the camera assemblies are arranged to correspond.

In the above-mentioned embodiments, the first and the second of the camera assemblies are respectively configured to receive and detect light passing through two light guiding holes.

In the above-mentioned embodiments, the first of the camera assemblies includes an OIS (Optical Image Stabilizer) adapter for controlling the movement of the lens unit in the first of the camera assemblies along a direction perpendicular to an optical axis thereof. In addition, the second of the camera assemblies includes a VCM (voice coil motor) for controlling the movement of the lens unit in the second of the camera assemblies along the optical axis thereof. The first and the second of the first and the second camera assemblies each includes an optical sensor, and a plane on which the optical sensor of the first of the camera assemblies is located is perpendicular to the plane on which the optical sensor of the second of the camera assemblies is located.

Alternatively, the first of the camera assemblies includes an OIS adapter for controlling the movement of the lens unit in the first of the camera assemblies along a direction perpendicular to an optical axis thereof. In addition, the second of the camera assemblies includes an OIS adapter for controlling the movement of the lens unit in the second of the camera assemblies along a direction perpendicular to an optical axis thereof. The first and the second of the first and the second camera assemblies each includes an optical sensor, and a plane on which the optical sensor of the first of the camera assemblies is located is parallel to a plane on which the optical sensor of the second of the camera assemblies is located.

In the above-mentioned embodiments, the camera module further includes a light guiding assembly arranged to be adjacent to the first of the camera assemblies and configured to guide the light, passing through the light guiding hole to which the first of the camera assemblies is arranged to correspond, to the first of the camera assemblies In the above-mentioned embodiments, the light guiding assembly includes a light path control unit and a switching unit. The light path control unit is pivotable about a rotation axis so as to guide the light passing through a first and a second of the light guiding holes which are arranged to be facing one another to the first of the camera assemblies. The switching unit includes a magnetic element configured to control the rotation angle of the light path control unit, wherein a distance between the magnetic element of the switching unit and the magnetic element of the second of the camera assemblies is greater than a distance between the first of the light guiding holes corresponding to the first of the camera assemblies and a third of the light guiding holes corresponding to the second of the camera assemblies.

In the above-mentioned embodiments, the light guiding assembly is selected from a group consisting of a prism, a reflective mirror, and a refraction mirror.

In the above-mentioned embodiments, the magnetic element is selected from a magnet or a yoke.

BRIEF DESCRIPTION OF THE DRAWINGS

For a more complete understanding of the embodiments and the advantages thereof, reference is now made to the following descriptions taken in conjunction with the accompanying drawings.

DESCRIPTION OF THE ILLUSTRATIVE EMBODIMENTS

Figure 1:
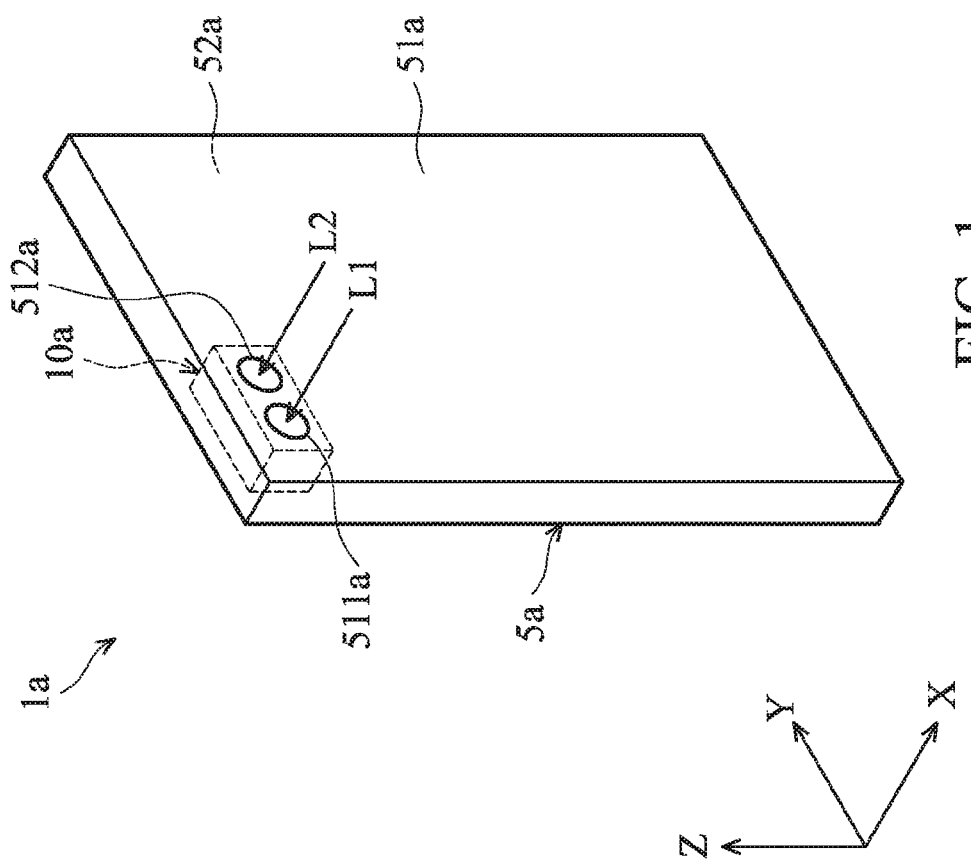
FIG. 1 shows a schematic view of an electronic device, in accordance with some embodiments.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplar) embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows a schematic via of a camera module 10a applied to an electronic device 1a, in accordance with some embodiments. The electronic device 1a may be a hand-held electronic device, such as a mobile phone, tablet, or notebook. Alternatively, the electronic device 1a may be a wearable electronic device, such as a watch. Alternatively, the electronic device 1a may be an automotive electronic device, such as a dash-mounted digital video recorder.

In accordance with some embodiments, the electronic device 1a includes a housing 5a and a camera module 10a. The camera module 10a is arranged to correspond to light guiding holes formed on the housing 5a for facilitating 3D photography. For example, as shown in FIG. 1, the housing 5a has a first surface 51a and a second surface 52a facing the first surface 51a. Two light guiding holes, such as light guiding holes 511a and 512a, are formed on the first surface 51a. The two light guiding holes 511a and 512a define two channels enabling light to enter the housing 5a. The camera module 10a is arranged to correspond to two light guiding holes 511a and 512a and positioned in the housing 5a for receiving and detecting light L1 and L2.

In some embodiments, the two light guiding holes 511a and 512a each has a circular shape and has the same pore size. However, the disclosure should not be limited thereto. The pore size and the shape of the two light guiding holes 511a and 512a can vary according to demand. In some embodiments, the two light guiding holes 511a and 512a are separated from one another by a distance, and the light guiding hole 511a is not communicated to the light guiding hole 512.

It should be appreciated that the numbers of the light guiding holes formed on the housing 5a should not to be limited to the above-mentioned embodiments. In some embodiments, three (or more) light guiding holes are formed on a single surface of the housing 5a so as to produce images in a specific format. In some embodiments, the housing 5a is omitted, and a number of light guiding holes are formed on the camera module 10a. The camera module 10a receives and detects light passing through the light guiding holes. Details regarding to the feature will be described in the description below.

Figure 2:
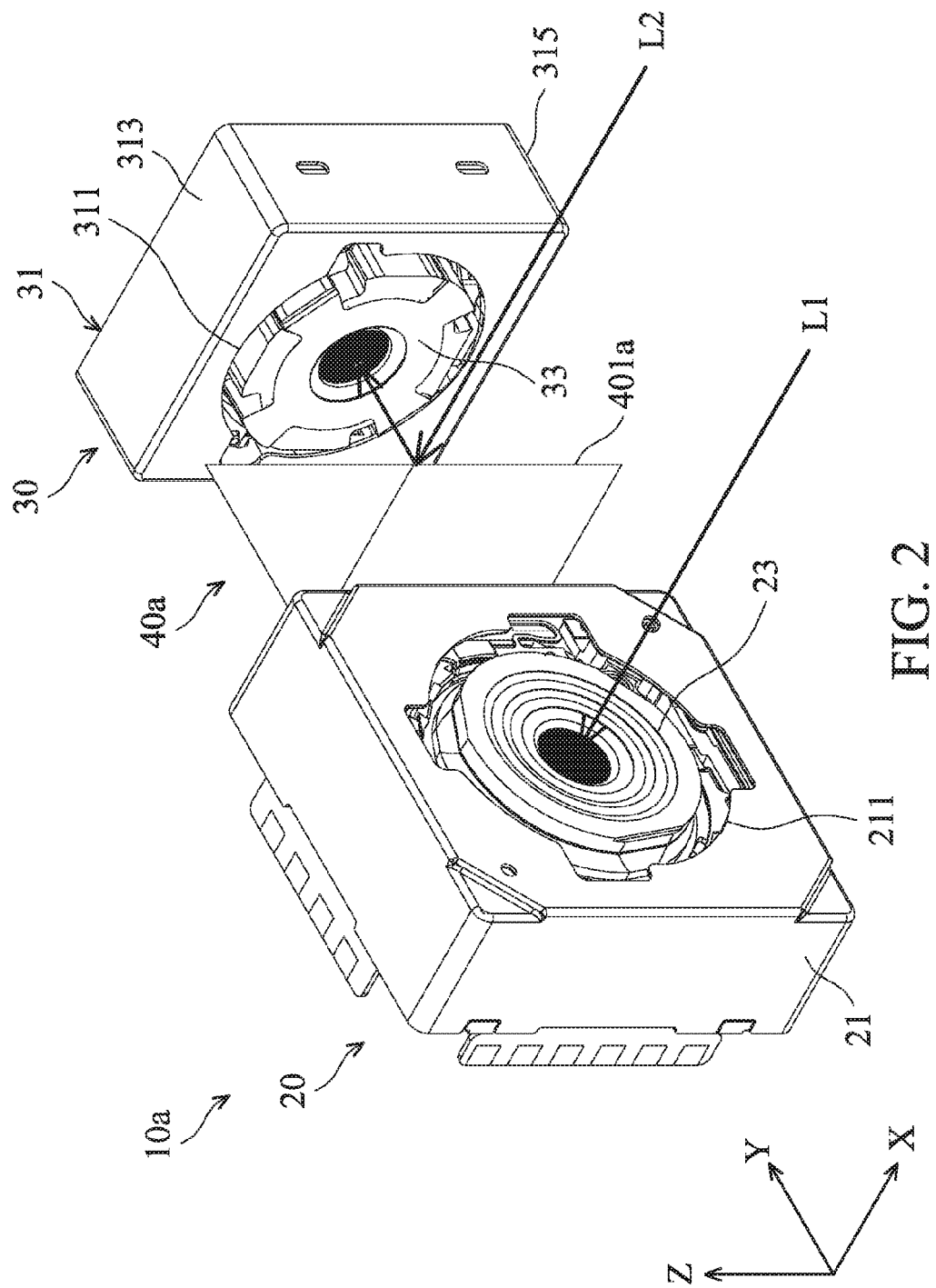
FIG. 2 shows a schematic view of a camera module, in accordance with some embodiments.

Referring to FIG. 2, in accordance with some embodiments, the camera module 10a includes a number of camera assemblies for receiving and detecting light passing through the corresponding light guiding holes. For example, the camera module 10a includes two camera assemblies, such as camera assemblies 20 and 30. The camera assembly is configured to receive and detect light L1 passing through the light guiding hole 511a of the housing 5a. The camera assembly is configured to receive and detect light L2 passing through the light guiding hole 512a of the housing 5a. For the purposes of illustration, in the embodiments of FIGS. 1-5, the camera assembly 20 is referred to as the first camera assembly, and the camera assembly 30 is referred to as the second camera assembly.

Figure 3:
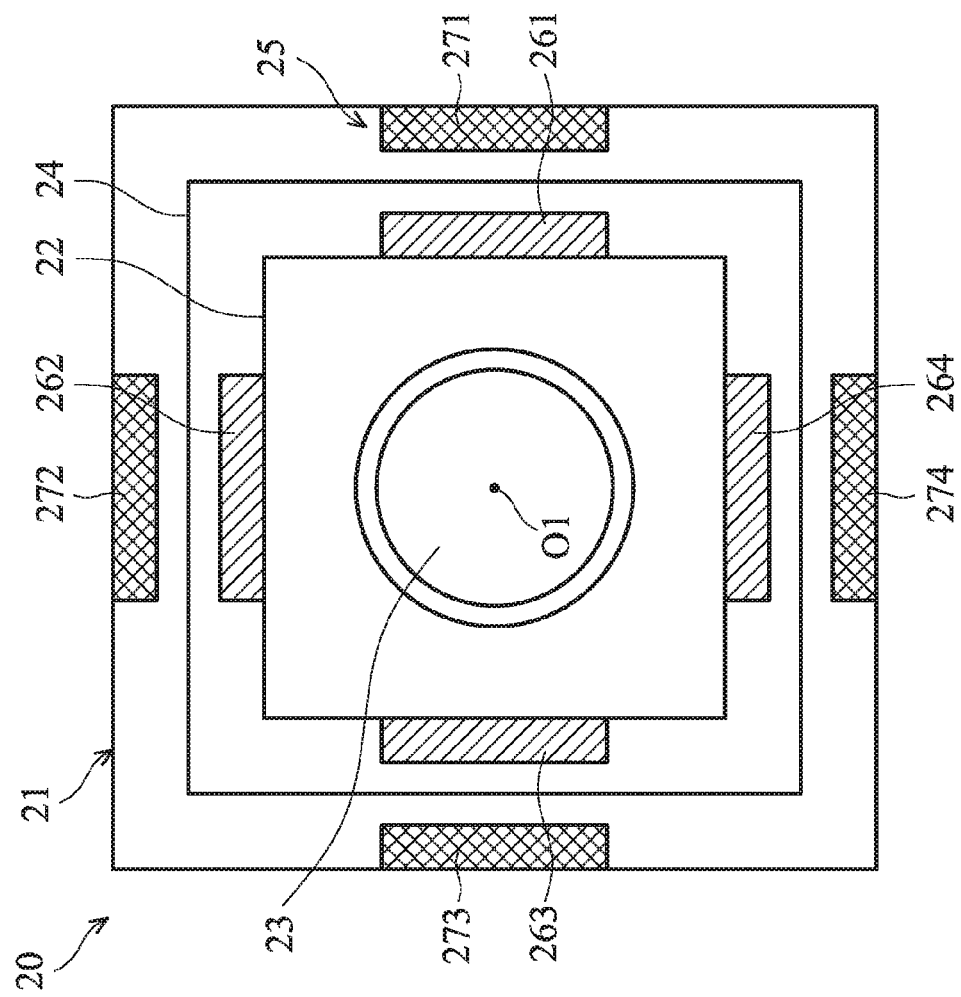
FIG. 3 shows a schematic view of some elements of an electronic device, in accordance with some embodiments.

Referring to FIG. 3, in some embodiments, the first camera assembly 20 includes a shield 21, a lens supporting unit 22, a lens unit 23, an optical sensor 24, and at least one electromagnetic driving unit. The shield 21 defines an accommodation space, and an opening 211 (FIG. 2) is formed on the front surface of the shield 21. In some embodiments, the lens holding unit 22, the lens unit 23, the optical element 24, and the electromagnetic driving unit are positioned in the accommodation space.

In some embodiments, the lens holding unit 22 is positioned inside of the shield 21 and is movable relative to the optical sensor 24. For example, the lens holding unit 22 is suspended in the shield 21 via flexible wire.

The lens holding unit 22 is configured to hold the lens unit 23. In some embodiments, the lens holding unit 22 defines a channel corresponding to the opening 211 (FIG. 2). The lens unit 23 is positioned in the channel of the lens holding unit 22, so that the optical axis O1 and the lens holding unit 23 is parallel to the X-axis shown in FIGS. 2 and 3 and passes through the opening 211. The optical sensor 24 is disposed behind the lens unit 23. To produce an image, the light passing through the opening 211 is transmitted along the optical axis O1 and is received by the lens unit 23. Afterwards, the light is transmitted to the optical sensor 24, and the optical sensor 24 detects the light and produces a signal for imaging. The optical sensor 24 may include an image sensor consisting of light-sensing elements such as CCD and CMOS.

In some embodiments, one of the electromagnetic driving units of the first camera assembly 20 is an anti-vibration electromagnetic driving unit 25. The anti-vibration electromagnetic driving unit 25 is configured to control the movement of the lens holding unit 22 in directions (Y-axis and Z-axis as shown in FIG. 3) perpendicular to the optical axis O1.

In some embodiments, the anti-vibration electromagnetic driving unit 25 includes an OIS (optical imaging stabilizer) adapter, and a movement detector (not shown in figures). The OIS adapter includes two Y-axis magnetic elements 271 and 273, two Z-axis magnetic elements 272 and 274, two Y-axis coils 261 and 263, and two Z-axis coils 262 and 264. In some embodiments, as shown in FIG. 3, the two Y-axis magnetic elements 271 and 273 are positioned on two opposite sides of the inner surface of the shield 21. The two Y-axis coils 261 and 263 are positioned on the two opposite sides of the lens holding unit 22 and are arranged to correspond to the two Y-axis magnetic elements 271 and 273. Additionally, the two Z-axis magnetic elements 272 and 274 are positioned on two opposite sides of the inner surface of the shield 21. The two Z-axis coils 262 and 264 are positioned on the two opposite sides of the lens holding unit 22 and are arranged to correspond to the two Z-axis magnetic elements 272 and 274.

In some embodiments, the movement detector of the anti-vibration electromagnetic driving unit 25 is positioned on the lens holding unit 22 and are arranged to correspond to the two Y-axis magnetic elements 271 and 273, and the two Z-axis magnetic elements 272 and 274. The movement detector determines the shifting value of the lens holding unit along the Y-axis and Z-axis by detecting magnetic field change and produces a signal according to the detection results. A controller (not shown in figures) of the camera module 10a issues electric current to the two Y-axis magnetic elements 271 and 273 and the two Z-axis magnetic elements 272 and 274 according to the signal detected from the movement detector to perform a compensatory motion. The two Y-axis magnetic elements 271 and 273 and the two Z-axis magnetic elements 272 and 274 may be magnets or yokes.

In some embodiments, another electromagnetic driving unit of the first camera assembly 20 includes an AF electromagnetic driving unit (not shown in figures). The AF electromagnetic driving unit includes a motor connected to the lens holding unit 22 so as to drive the lens unit 23 to linearly move along the optical axis O1. As a result, the position of the lens unit 23 relative to the optical sensor 24 can vary for facilitating a change of the focal length to auto-focus. The AF electromagnetic driving unit may be a voice coil motor or a step motor.

Figure 4:
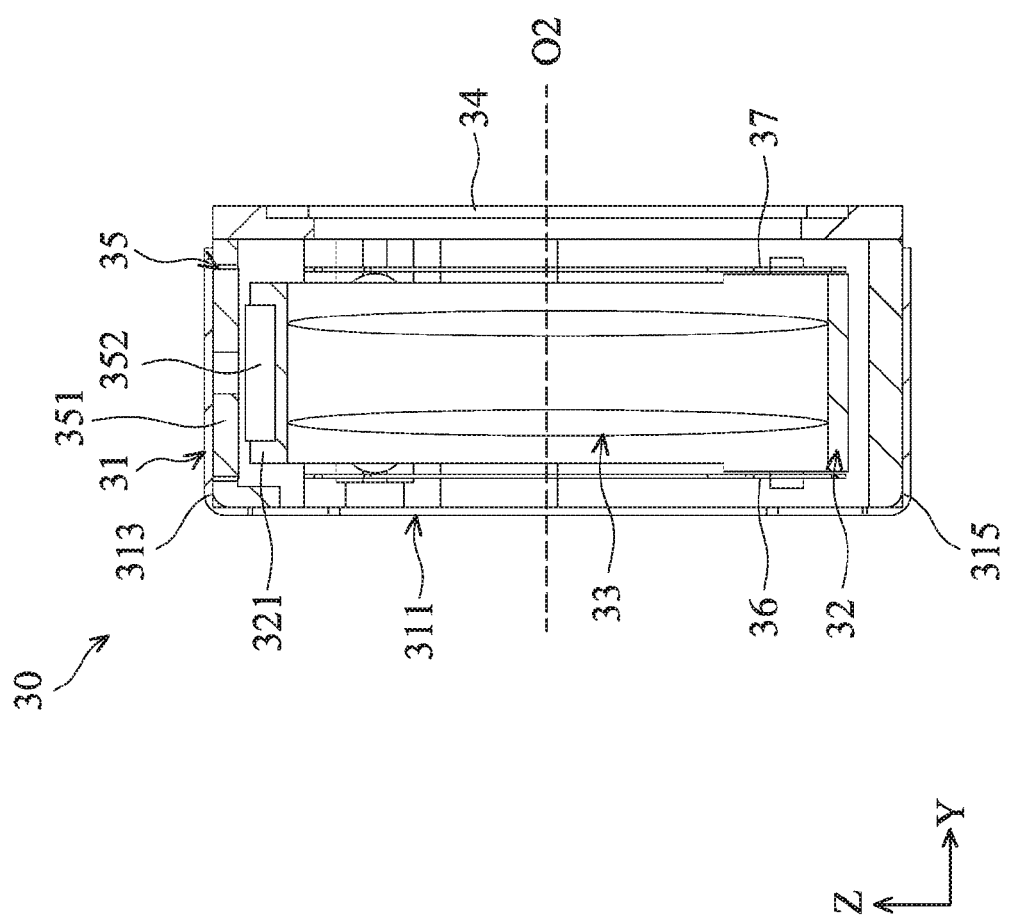
FIG. 4 shows a schematic view of some elements of an electronic device, in accordance with some embodiments.

Referring to FIG. 4, in some embodiments, the first camera assembly 30 includes a shield 31, a lens supporting unit 32, a lens unit 33, an optical sensor 34, and at least one electromagnetic driving unit. The shield 31 defines an accommodation space, and an opening 311 (FIG. 3) is formed on the front surface of the shield 31. In some embodiments, the lens holding unit 32, the lens unit 33, the optical element 34, and the electromagnetic driving unit are positioned in the accommodation space.

In some embodiments, the lens holding unit 32 is positioned inside of the shield 31 and is movable relative to the optical sensor 34. For example, the lens holding unit 32 is suspended in the shield 31 via two flexible sheets 36 and 37.

The lens holding unit 32 is configured to hold the lens unit 33. In some embodiments, the lens holding unit 32 defines a channel corresponding to the opening 311 (FIG. 3). The lens unit 33 is positioned in the channel of the lens holding unit 32, so that the optical axis O1 and the lens holding unit 33 is parallel to the X-axis shown in FIGS. 2 and 3 and passes through the opening 311. The optical sensor 34 is disposed behind the lend unit 33. To produce an image, the light passing through the opening 311 is transmitted along the optical axis O2 and is received by the lens unit 33. Afterwards, the light is objected to the optical sensor 34, and the optical sensor 34 detects the light and produces a signal for imaging. The optical sensor 34 may include an image sensor consisting of light-sensing elements such as CCD and CMOS.

Figure 5:
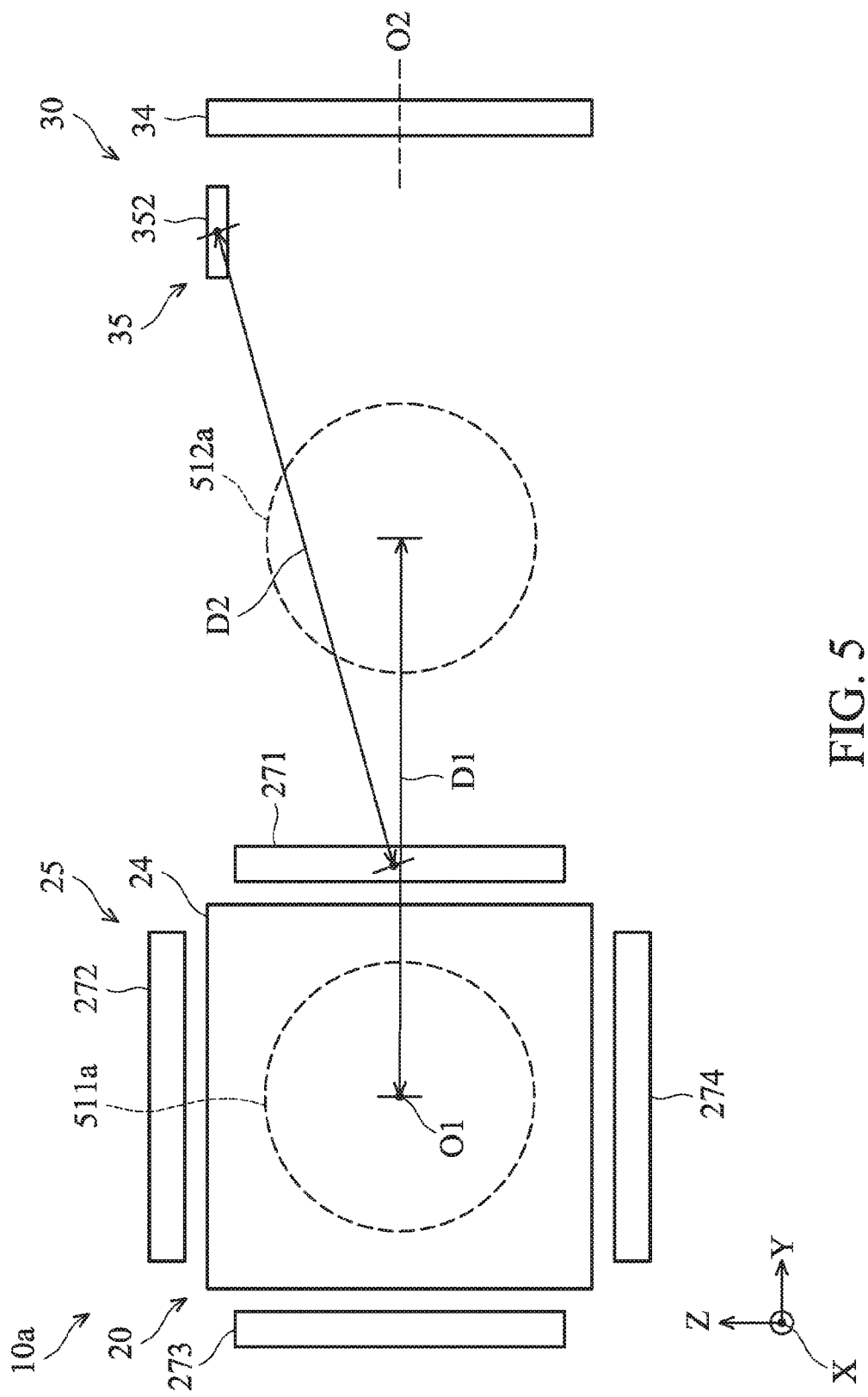
FIG. 5 shows a schematic view of some elements of an electronic device and corresponding light guiding holes, in accordance with some embodiments.

It should be appreciated that the optical sensor 24 of the first camera assembly 20 and the optical sensor 34 of the second camera assembly 30 are located on different planes. For example, as shown in FIG. 5, the plane on which the optical sensor 24 of the first camera assembly 20 is located is perpendicular to the plane on which the optical sensor 34 of the second camera assembly 30 is located.

Referring to FIG. 4 again, in some embodiments, the electromagnetic driving unit 35 of the second camera assembly 30 is a VCM (voice coil motor). The voice coil motor includes a coil 351 and a magnetic element 352. The coil 351 is disposed on the upper housing member 313 of the lens holding unit 32. During the operation of the second camera assembly 30, the controller (not shown in figures) of the camera module 10a issues electric current to the coil 351 so as drive the lens unit 33 to linearly move along the optical axis O2. As a result, the position of the lens unit 33 relative to the optical sensor 34 can vary for facilitating the change of the focal length to auto-focus. The magnetic element 352 may be a magnet or a yoke.

Referring to FIG. 2, in some embodiments, the camera module 10a further includes a light guiding assembly 40a. The light guiding assembly 40a is positioned between the first and the second camera assemblies 20 and 30 and is arranged to be adjacent to the second camera assembly 30. The light guiding assembly 40a is configured to guide light passing through the light guiding hole 512a to the second camera assembly 30. In some embodiments, the light guiding assembly 40a includes a reflection/refraction surface 401a which is arranged in a 45 degrees angle relative to the light guiding hole 512a and directly faces the light guiding hole 512a. The reflection/deflection surface 401a is configured to redirect the light L2 transmitted along the X-axis direction shown in FIG. 2 to a direction parallel to the optical axis O2 (FIG. 4) of the lens unit 33. The light guiding assembly 40a may be a prism, a reflection mirror, or a refraction mirror.

In some embodiments, the light guiding assembly 40a is omitted, and the camera assembly 30 includes one or more optical elements, such as prism or reflection mirror. The optical element is configured to redirect the light L2 transmitted along the X-axis direction shown in FIG. 2 to a direction parallel to the optical axis O2 (FIG. 4) of the lens unit 33. The optical element may be positioned in the shield of the camera assembly. In this case, the plane on which the opening of the second camera assembly is located is parallel to the plane on which the opening 211 of the shield 21 is located. Therefore, the opening 211 of the first camera assembly and the opening of the camera assembly serve as the light guiding holes. The camera module receives and detects light passing through the two light guiding holes.

As shown in FIG. 5, in some embodiments, the two magnetic elements 271 and 352 are separated by a distance of D2. The two magnetic elements 271 and 352 are two magnetic elements which are respectively positioned in the first and the second camera assemblies 20 and 30 and closest to each other. In addition, the light guiding holes 511a and 512a, respectively corresponding to the camera module 20 and 30, are separated by a distance of D1. The distance D2 is greater than the distance D1. As a result, in cases where the electromagnetic driving unit 25 of the first camera assembly 20 is operating normally, the distance between the two light guiding holes 511a and 512a is minimized, and thus the image quality and the image processing rate of the camera module 10a in a 3D photography operation are improved.

Table (1) shows distances between the magnetic element 352 of the second camera assembly 30 and the magnetic elements 271, 272, 273, and 274 of the first camera assembly 20 in cases where the two light guiding holes 511a and 512a are separated by a distance of 10 mm and the electromagnetic driving unit 25 is operating normally. The unit of table (1) is millimeter. It is appreciated that table (1) is an exemplary case, and the disclosure should not be limited thereto.

TABLE 1

| Magnetic Element | Distance in X-axis | Distance in Y-axis | Distance in Z-axis | Linear Distance |
| --- | --- | --- | --- | --- |
| 271 | 2.5977 | 15.605 | 3.4 | 16.181 |
| 272 | 2.5977 | 20.2 | 1.195 | 20.4014 |
| 273 | 2 5977 | 24.795 | 3.4 | 25.1615 |
| 274 | 2 5977 | 20.2 | 7.995 | 21.8794 |

Figure 6:
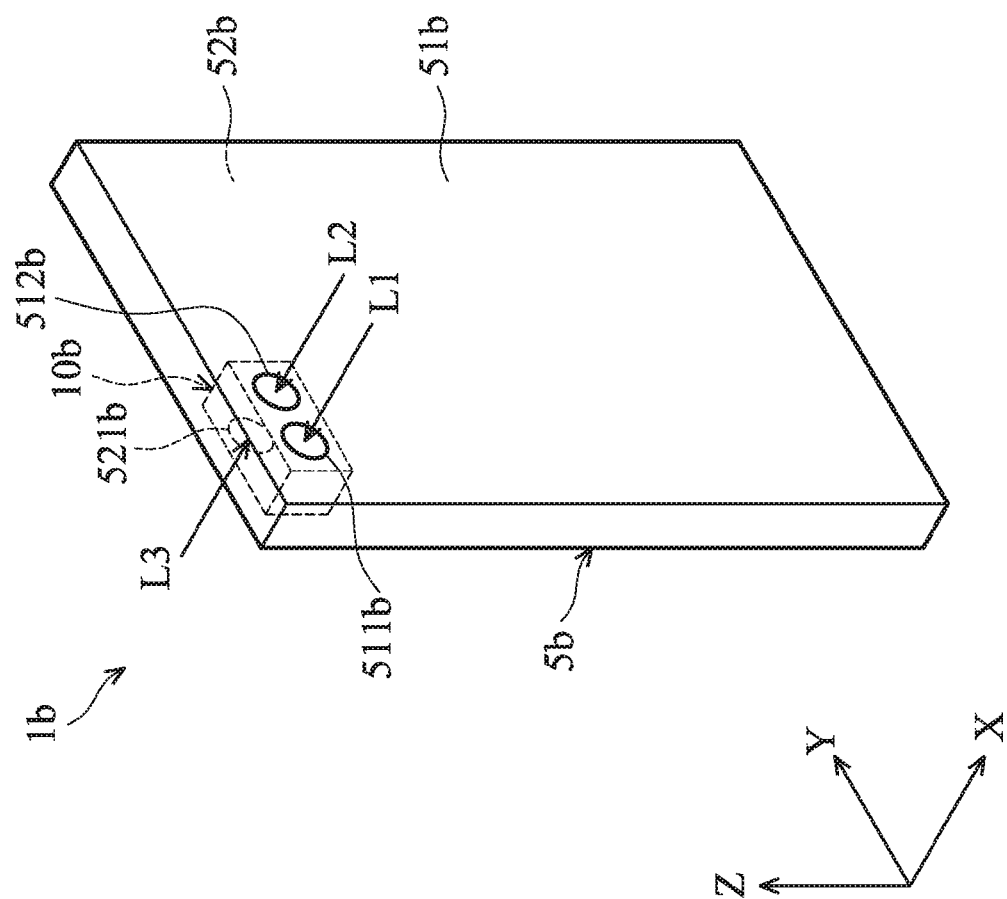
FIG. 6 shows a schematic view of an electronic device, in accordance with some embodiments.

FIG. 6 shows a schematic view of a camera module 10b being applied to an electronic device 1b, in accordance with some embodiments. The electronic device 1b may be a hand-held electronic device, such as a mobile phone, tablet, or note-book. Alternatively, the electronic device 1b may be a wearable electronic device, such as a watch. Alternatively, the electronic device 1b may be an automotive electronic device, such as a dashboard-mounted digital video recorder.

In accordance with some embodiments, the electronic device 1b includes a housing 5b and a camera module 10b. The camera module 10b is arranged to correspond to light guiding holes formed on the housing 5b for facilitating 3D photography or 2D photography. For example, as shown in FIG. 6, the housing 5b has a first surface 51b and a second surface 52b facing the first surface 51b. Two light guiding holes, such as light guiding holes 511b and 512b, are formed on the first surface 51b. In addition, one light guiding hole, such as light guiding hole 521b is formed on the second surface 52b. The three light guiding holes 511b, 512b, and 521b define three channels enabling light to enter the housing 5b. The camera module 10b is arranged to correspond to the three light guiding holes 511b, 512b, and 521b and is positioned in the housing 5a for receiving and detecting light L1, L2, and L3.

In some embodiments, the three light guiding holes 511b, 512b, and 521b each has a circular shape and has the same pore size. However, the disclosure should not be limited thereto. The pore size and the shape of the three light guiding holes 511b, 512b, and 521b can vary according to demand. In some embodiments, both of the light guiding holes 511b and 512b have the same shape and pore size, and the shape and pore size of the light guiding holes 511b and 512b is different from that of the light guiding hole 521b. In some embodiments, the two light guiding holes 511b and 512b are separated from one another by a distance, and the light guiding hole 511a does not communicate with the light guiding hole 512b. In some embodiments, the two light guiding holes 511b and 512b are separated by a distance of less than 10 mm.

Figure 7:
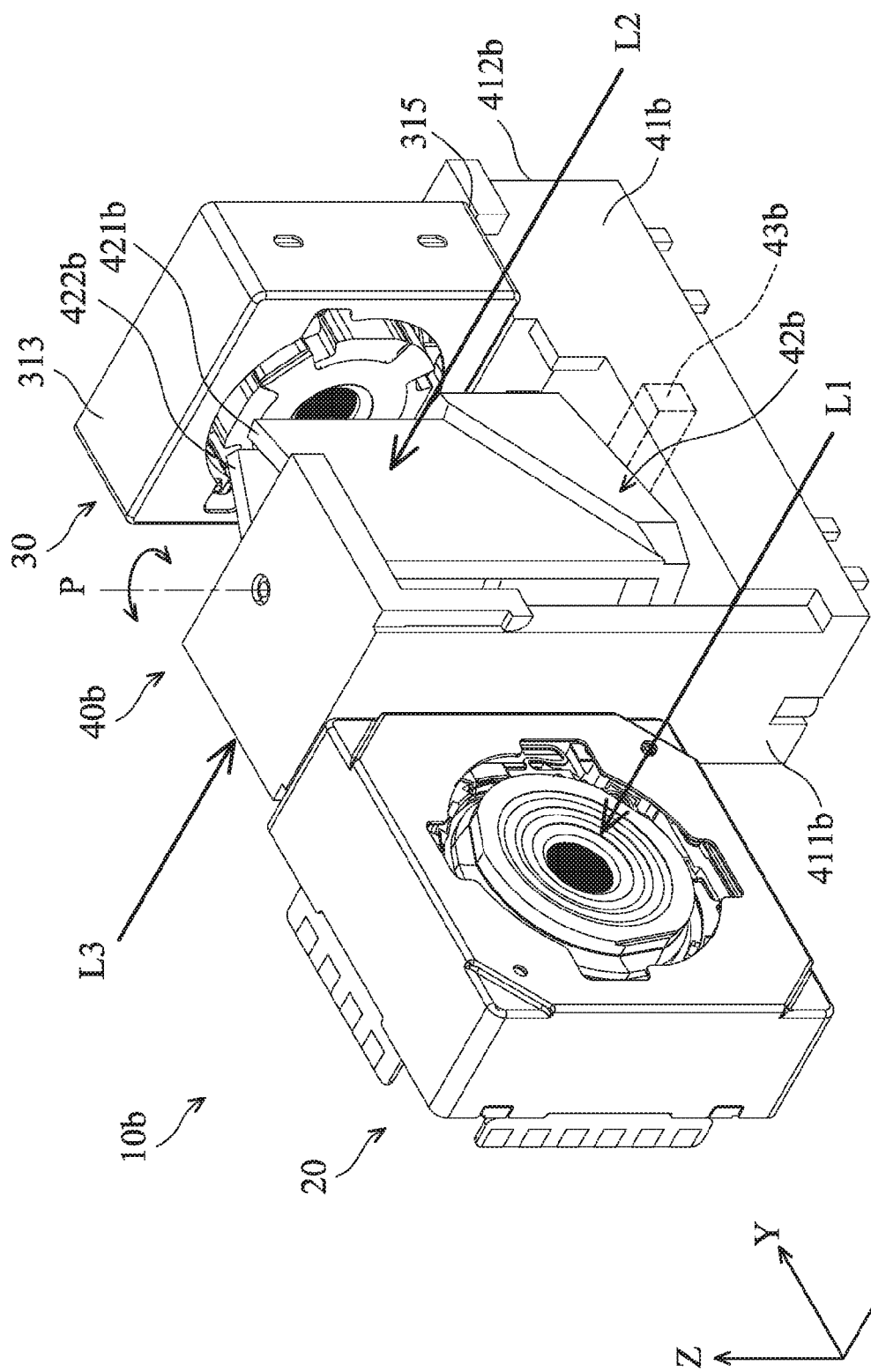
FIG. 7 shows a schematic view of a camera module, in accordance with some embodiments.

FIG. 7 shows a schematic view of the camera module 10b. In FIG. 7, elements that are identical with or similar to the elements of the camera module 10a shown in FIG. 2 are designated by the same reference number, and the features thereof are not repeated for the purpose of brevity. The difference between the camera module 10b and the camera module 10a includes the light guiding assembly 40a being replaced by the light guiding assembly 40b.

The camera assemblies 20 and 30 are configured to receive and detect light passing through the corresponding light guiding holes. For example, the camera assembly 20 is configured to receive and detect light L1 passing through the light guiding hole 511b (FIG. 6) of the housing 5b. In addition, the camera assembly 30 is configured to receive and detect light L2 passing through the light guiding hole 512b (FIG. 6) of the housing 5b. Alternatively, the camera assembly 30 is configured to receive and detect light L3 passing through the light guiding hole 521b (FIG. 6) of the housing 5b. For the purposes of illustration, in the embodiments of FIGS. 6-8, the camera assembly 20 is referred to as the first camera assembly, and the camera assembly 30 is referred to as the second camera assembly.

The light guiding assembly 40b is configured to selectively guide light L2 and L3 passing through the light guiding holes 512b and 521b to the second camera assembly 30. In some embodiments, the light guiding assembly 40b includes a base 41b, a light path control unit 42b, and a switching unit 43b. The base 41b extends from a first side 411b to a second side 412b. The first camera assembly 20 is arranged to be adjacent to the first side 411b. The first camera assembly 20 may be connected to the base 41b or separated from the base 41b by a distance. The second camera assembly 30 is arranged to be adjacent to the second side 412b and is connected to the base 41b via the lower housing member 315. The lower housing member 315 and the upper housing member 313 are located at two opposite side of the second camera assembly 30.

The light path control unit 42b is located between the first camera assembly 20 and the second camera assembly 30 and is disposed on the base 41b. The light path control unit 42b is pivotable about a rotation axis P. The light path control unit 42b includes a first light guiding element 421b and a second light guiding element 422b. In some embodiments, the first and the second light guiding elements 421b and 422b each includes a reflection/refraction surface, and an included angle is formed between the reflection/refraction surfaces. The first and the second light guiding elements 421b and 422b may be prisms, reflection mirrors, or refraction mirrors.

The switching unit 43b is disposed in the base 41b and is configured to actuate the path control unit 42b to rotate about the rotation axis P so as to control the rotation angle of the light path control unit 42b relative to the light guiding holes 512b and 521b. In some embodiments, the switching unit 43 is an electrical valve that includes a magnetic element. However, the disclosure should not be limited thereto. The switching unit 43b may be a step motor, DC motor or the like.

The switching unit 43b may be operated in at least two states so as to actuate the light path control unit 42b to rotate about the rotation axis P by the principle of electromagnetic induction. For example, when the switching unit 43b is operated in a first state, the first light guiding element 421b of the light path control unit 42b directly faces the light guiding hole 512b and is arranged at an angle, such as 45 degrees, relative to the light L2 passing through the light guiding hole 512b. At this time, the light L2 passing through the light guiding hole 512b is directed to the second camera assembly 30 via the first light guiding element 421b. The camera module 10b utilizes the first and the second camera assemblies 20 and 30 to capture an image for facilitating 3D photography.

When the switching unit 43b is operated in a second state, the second light guiding element 422b of the light path control unit 42b directly faces the light guiding hole 521b and is arranged at an angle, such as 45 degrees, relative to the light L3 passing through the light guiding hole 521b. At this time, the light L3 passing through the light guiding hole 521b is directed to the second camera assembly 30 via the second light guiding element 422b. The camera module 10b utilizes the first camera assembly 20 and/or the second camera assembly 30 to capture an image for facilitating 2D photography.

Figure 8:
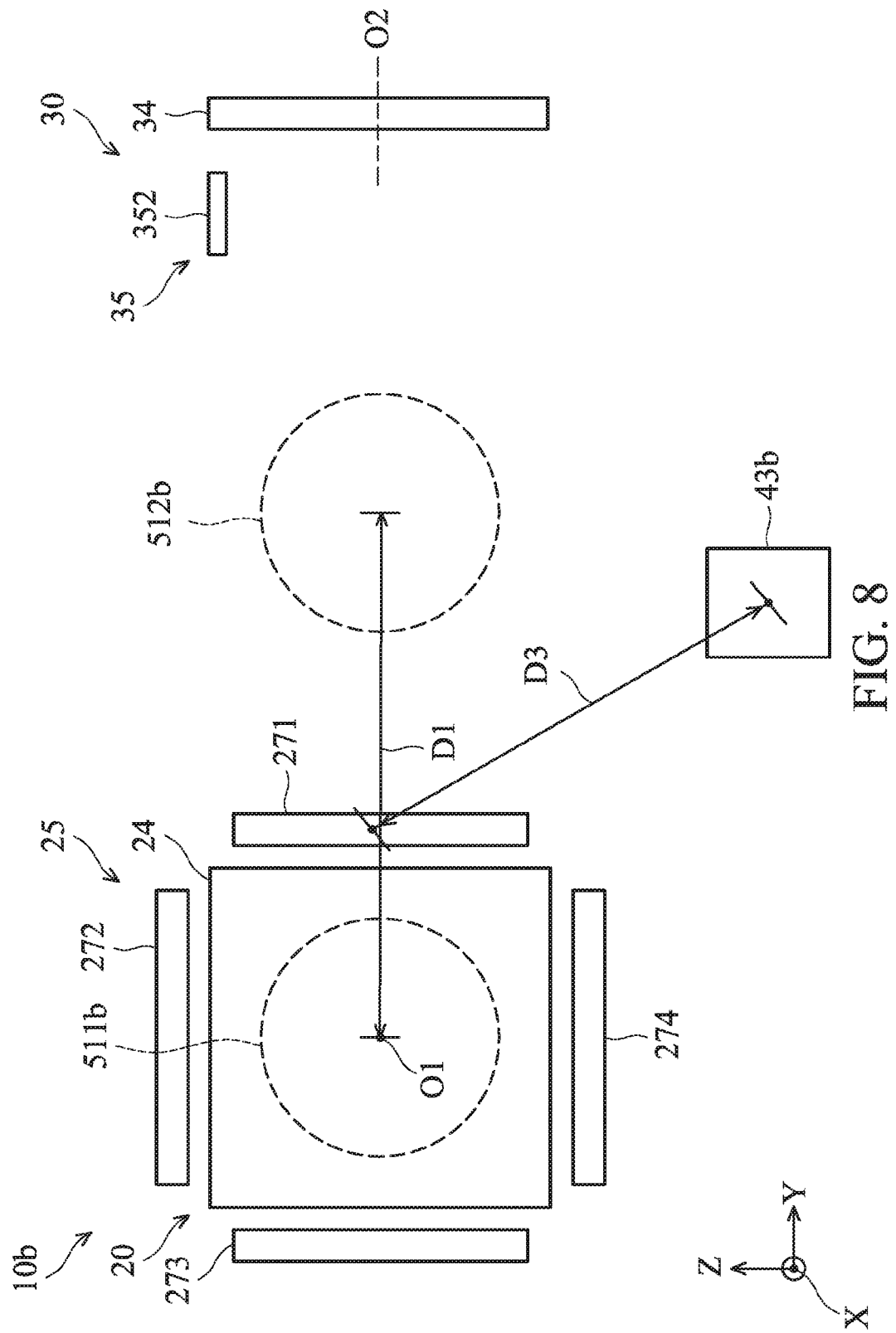
FIG. 8 shows a schematic view of some elements of an electronic device and corresponding light guiding holes, in accordance with some embodiments.

As shown in FIG. 8, in some embodiments, the magnetic element 271 and the magnetic element of the switching unit 43b are separated by a distance of D3. In addition, the light guiding holes 511b and 512b, respectively corresponding to the camera module 20 and 30, are separated by a distance of D1. The distance D3 is greater than the distance D1. As a result, in cases where the electromagnetic driving unit 25 is operating normally, the distance between the two light guiding holes 511b and 512b is minimized. Moreover, the image quality and the image processing rate of the camera module 10b performing a 3D photography operation are improved. Additionally, the camera module 10 is able to perform a 2D photography operation via the light guiding hole 521b.

Table (2) shows distances between the magnetic element of the switching unit 43b and the magnetic elements 271, 272, 273, and 274 of the first camera assembly 20 in cases where the two light guiding holes 511a and 512a are separated by a distance of 10 mm and the electromagnetic driving unit 25 is operating normally. The unit of table (2) is millimeter. It is appreciated that table (2) shows an exemplary case, and the disclosure should not be limited thereto.

TABLE 2

| Magnetic Element | Distance in X-axis | Distance in Y-axis | Distance in Z-axis | Linear Distance |
| --- | --- | --- | --- | --- |
| 271 | 2.9877 | 5.0050 | 7.2100 | 9.2715 |
| 272 | 2.9877 | 9.6000 | 11.805 | 15.5063 |
| 273 | 2.9877 | 14.195 | 7.2100 | 16.199 |
| 274 | 2.9877 | 9.6000 | 2.6150 | 10.3887 |

Figure 9:
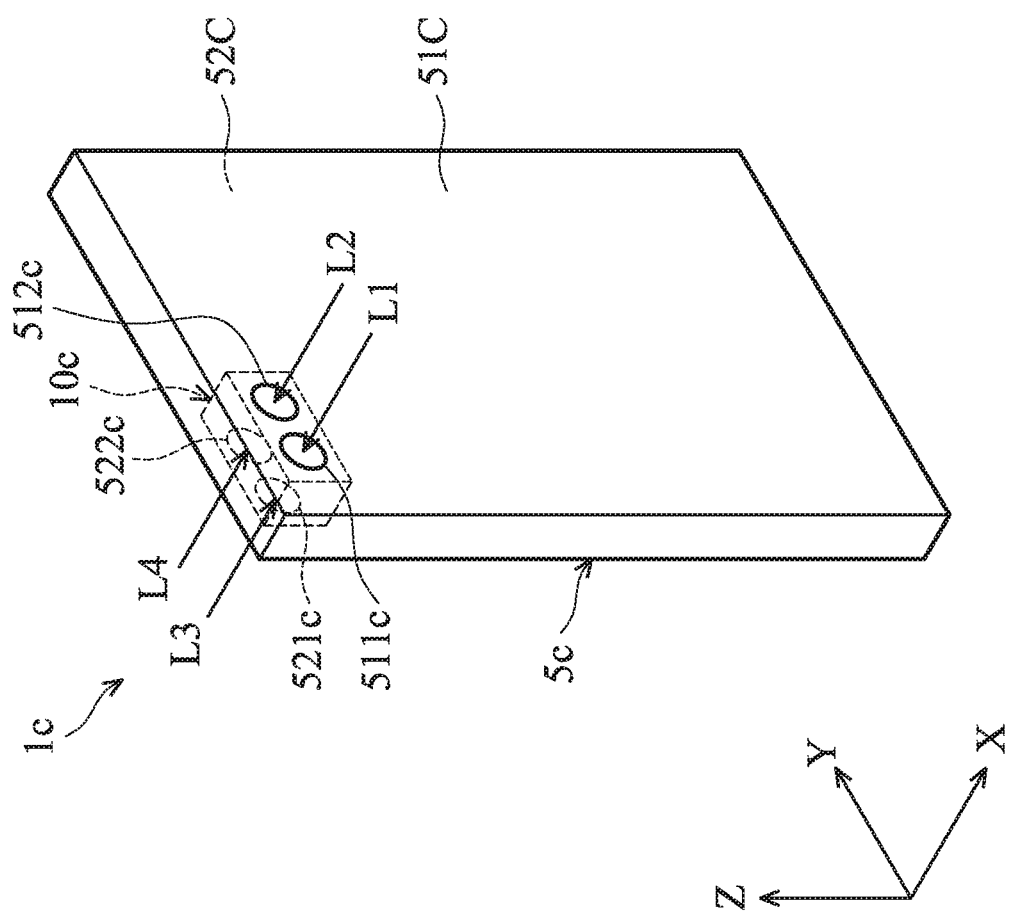
FIG. 9 shows a schematic view of an electronic device, in accordance with some embodiments.

FIG. 9 shows a schematic view of a camera module 10c being applied to an electronic device 1c, in accordance with some embodiments. The electronic device 1c may be a hand-held electronic device, such as a mobile phone, tablet, or note-book. Alternatively, the electronic device 1c may be a wearable electronic device, such as a watch. Alternatively, the electronic device 1c may be an automotive electronic device, such as a dashboard digital video recorder.

In accordance with some embodiments, the electronic device 1c includes a housing 5c and a camera module 10c. The camera module 10c is arranged to correspond to light guiding holes formed on the housing 5c for facilitating 3D photography or 2D photography. For example, as shown in FIG. 9, the housing 5c has a first surface 51c and a second surface 52c opposite to the first surface 51c. Two light guiding holes, such as light guiding holes 511c and 512c, are formed on the first surface 51b. In addition, two light guiding holes, such as light guiding holes 521c and 522c, are formed on the second surface 52b. The light guiding holes 511c, 512c. 521c, and 522c define four channels enabling light to enter the housing 5c. The camera module 10c is arranged to correspond to the three light guiding holes 511c, 512c, 521c, and 522c and is positioned in the housing 5c for receiving and detecting light L1, L2, L3, and L4.

Figure 10:
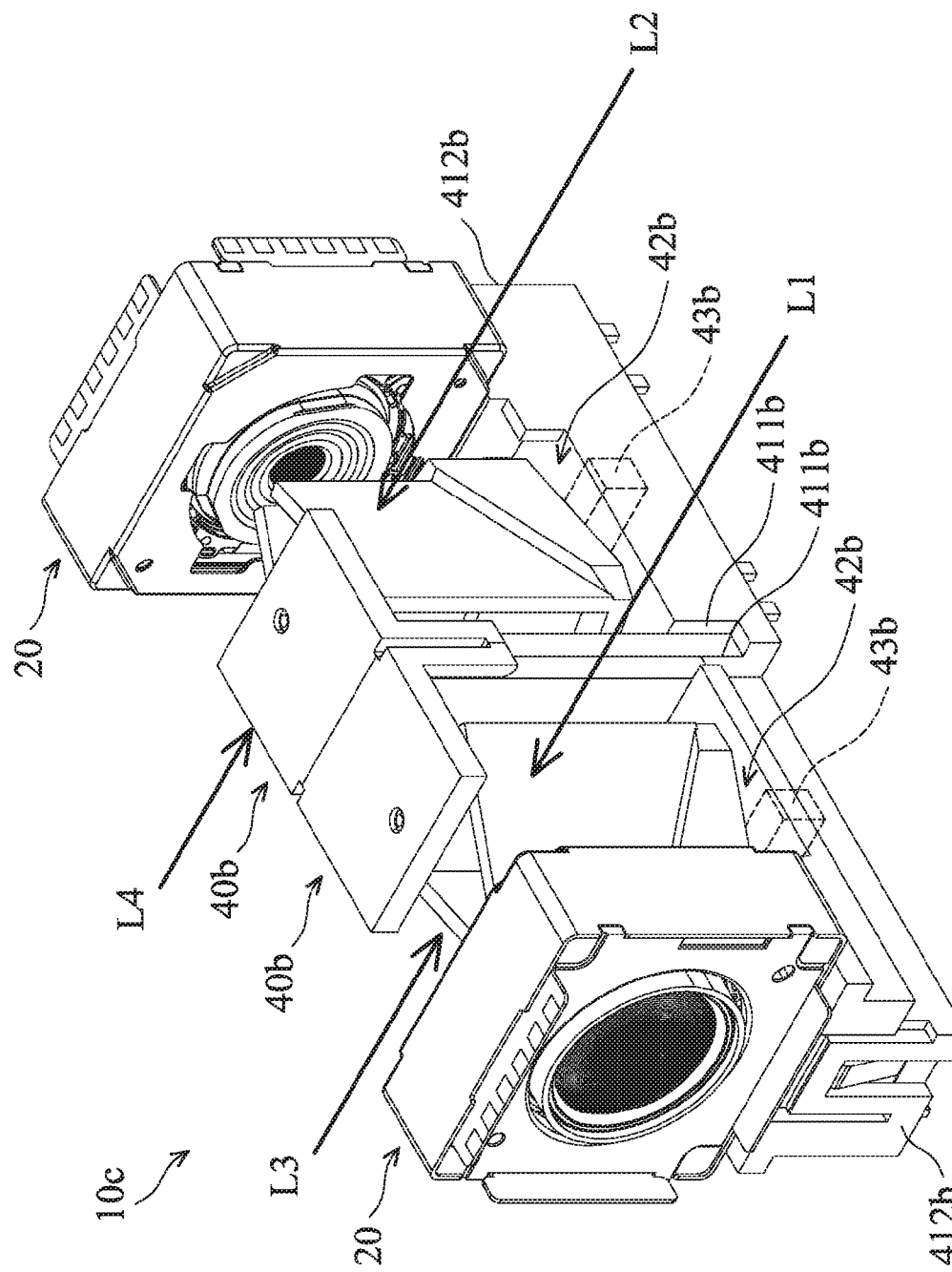
FIG. 10 shows a schematic view of a camera module, in accordance with some embodiments.

FIG. 10 shows a schematic view of the camera module 10c. In FIG. 10, elements that are identical with or similar to the element of the camera module 10b shown in FIG. 7 are designated by the same reference number, and the features thereof are not repeated for the purpose of brevity. The difference between the camera module 10c and the camera module 10b includes the omission of the camera assembly 30 and the camera module 10 including two camera assemblies 20 and two light guiding assemblies 40b.

The two camera assemblies 20 are configured to receive and detect light passing through the corresponding light guiding holes of the housing 5c. For example, the camera assembly 20 at the left side of FIG. 10 is configured to receive and detect light L1 passing through the light guiding hole 511c (FIG. 9) of the housing 5c or light L3 passing through the light guiding hole 521c (FIG. 9) of the housing 5c. The camera assembly 20 at the right side of the FIG. 10 is configured to receive and detect light L2 passing through the light guiding hole 512c (FIG. 9) of the housing 5c or light L4 passing through the light guiding hole 522c (FIG. 9) of the housing 5c.

The two light guiding assemblies 40b are configured to selectively guide light L2 and L3 passing through the light guiding holes 512b and 521b to the camera assembly 20. For example, the light guiding assemblies 40b at the left side of FIG. 10 are configured to selectively guide light L1 or L3, passing through the two light guiding holes 511b and 521b, to the camera assembly 20 at the left side of FIG. 10. The two light guiding holes 511b and 521b are arranged to face one another. The light guiding assembly 40b at the right side of FIG. 10 is configured to selectively guide light L2 or L4, passing through the two light guiding holes 512b and 522b, to the camera assembly 20 at the right side of FIG. 10. The two light guiding holes 512b and 522b are arranged to face one another.

Figure 11:
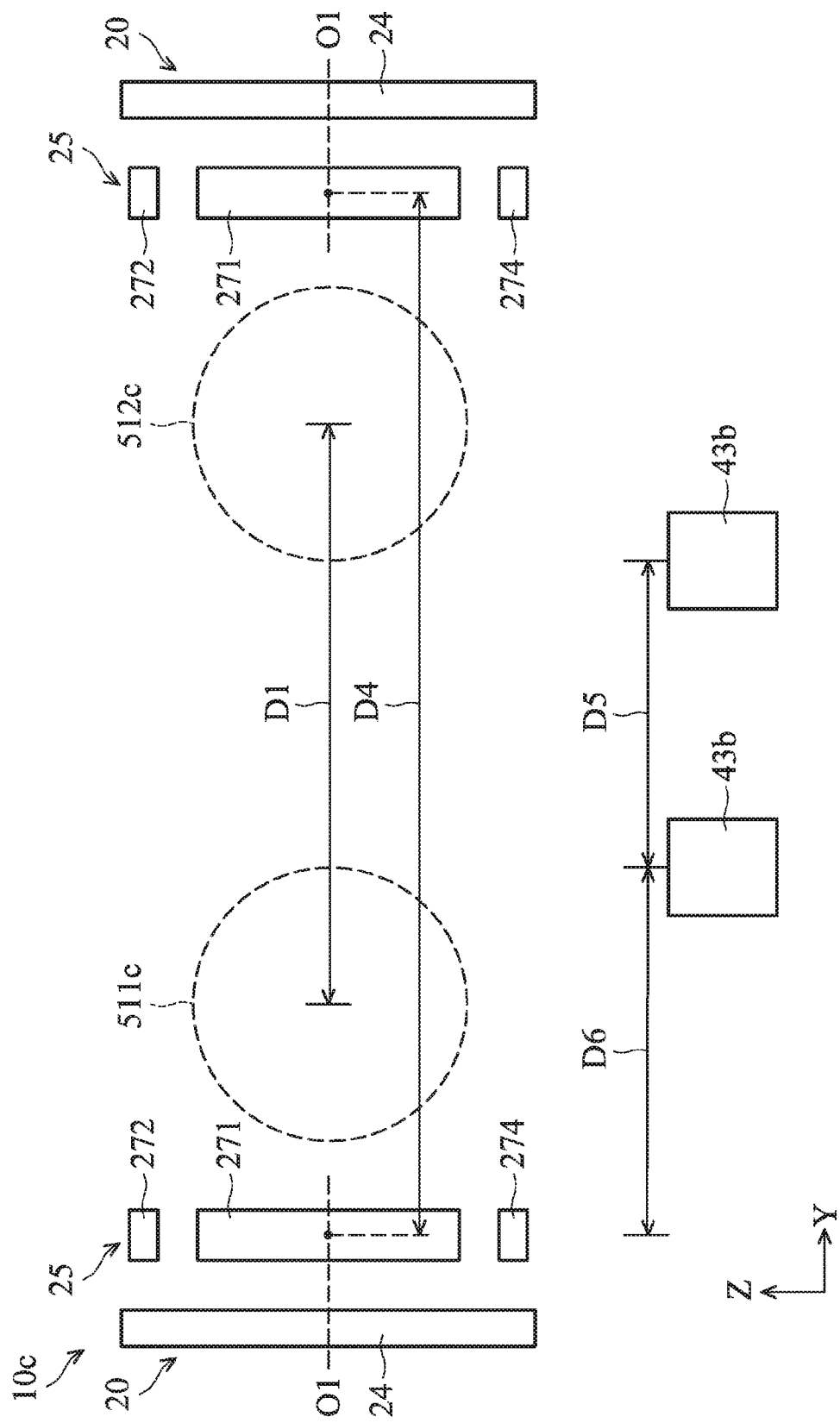
FIG. 11 shows a schematic view of some elements of an electronic device and corresponding light guiding holes, in accordance with some embodiments.

For the purposes of illustration, in the embodiments of FIGS. 9-11, the camera assembly 20 at the left side of FIG. 10 is referred to as the first camera assembly, and the camera assembly 20 at the right side of FIG. 10 is referred to as the second camera assembly. In addition, the light guiding assembly 40b at the left side of FIG. 10 is referred to as the first light guiding assembly, and the light guiding assembly 40b at the right side of FIG. 10 is referred to as the second light guiding assembly.

The second sides 412b of the first and the second light guiding assemblies 40b are arranged to be adjacent to one another. The first and the second camera assemblies 20 are respectively adjacent to the two second sides 411b of the two bases 41b and disposed on the two bases 41b. In some embodiments, the first and the second light guiding assemblies 40b are operated independently, and camera module 10c is able to simultaneously utilize the first and the second camera assemblies 20 to capture images for facilitating 2D photography or 3D photography.

As shown in FIG. 11, in some embodiments, the optical paths O1 of the first and the second camera assemblies 20 are located on the same straight line. In addition, the plane on which the optical sensor 24 of the first camera assembly 20 is located is parallel to the plane on which the optical sensor 24 of the second camera assembly 20 is located.

In some embodiments, the magnetic element 271 of the first camera assembly 20 and the magnetic element 271 of the second camera assembly 20 are separated by a distance of D4. In addition, the light guiding holes 511c and 512c, respectively corresponding to the first and the second camera assemblies 20, are separated by a distance of D1. The distance D4 is greater than the distance D1. As a result, in cases where the electromagnetic driving unit 25 is operating normally, the distance between the two light guiding holes 511c and 512c is minimized, and thus the image quality and the image processing rate of the camera module 10a for performing a 3D photography operation are improved. Additionally, the camera module 10 is able to perform 3D photography via the light guiding holes formed on the first surface 51c of the housing 5c or via the light guiding holes formed on the second surface 52c of the housing 5c.

In some embodiments, in cases where the two light guiding holes 511c and 512c are separated by a distance of less than 10 mm and the electromagnetic driving unit 25 is operating normally, the distances D4 between the magnetic elements 271 of the first and the second camera assembly 20 is 27.36 mm; the distances D5 between the magnetic elements of the two switching unit of first and the second light guiding assemblies 40b is 8.20 mm; and the distance D6 between the magnetic element 271 and the switching unit 43c is 9.58 mm. However, the disclosure should not be limited thereto.

Figure 12:
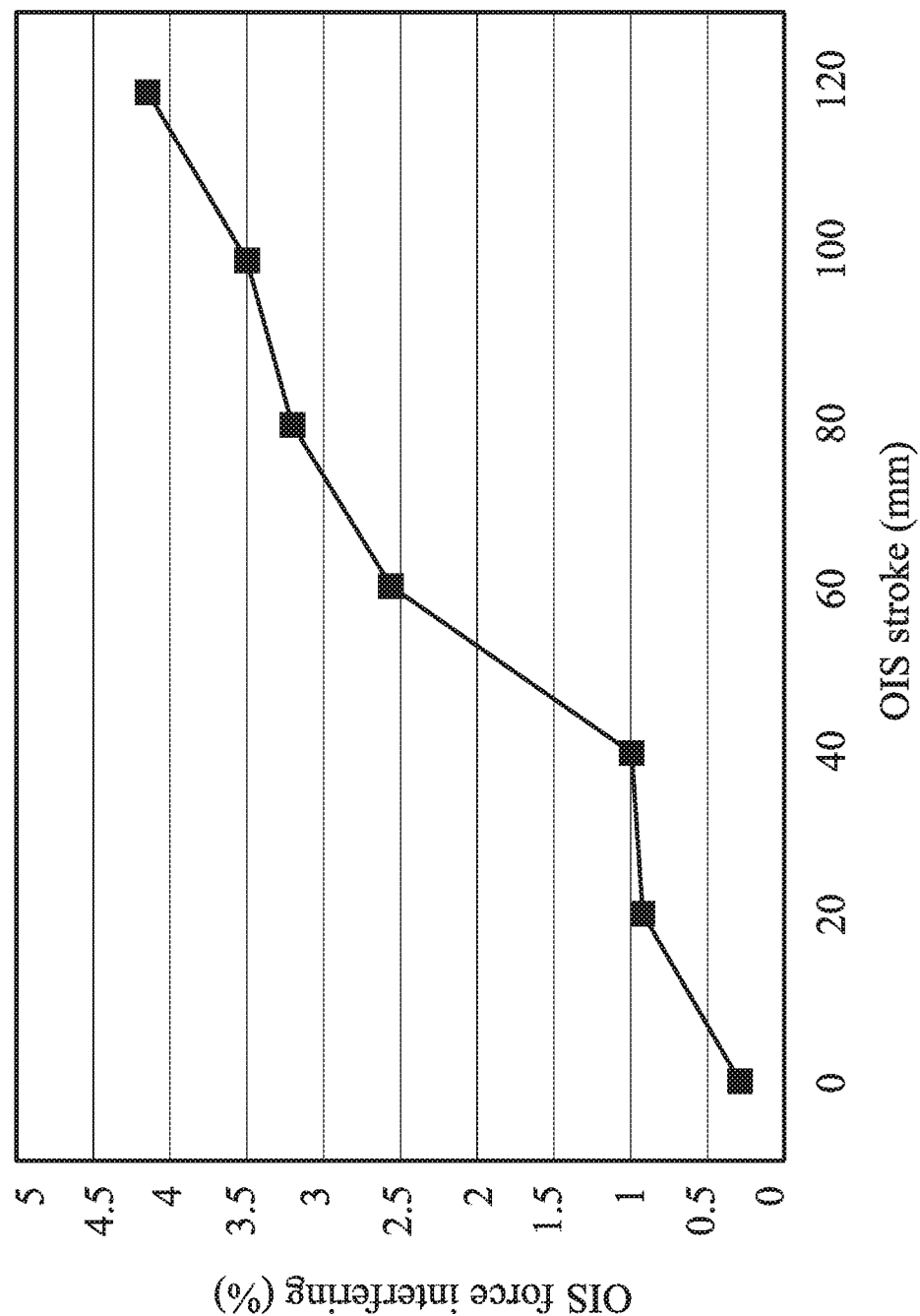
FIG. 12 is a diagram showing the interference rate of an anti-vibration electronic-magnetic control unit in relation to an magnetic element in another camera assembly.

FIG. 12 is a diagram showing the interference level of the anti-vibration electromagnetic control in different positions. The interference level is a ratio (A/B) of the interference force (A) to the reaction force (B), in which the interference force (A) is a force generated by the electromagnetic driving unit of another camera assembly over the anti-vibration electromagnetic driving unit 25, and the reaction force (B) is a force generated by the anti-vibration electromagnetic driving unit 25. From the diagram shown in FIG. 12, in cases where the OIS stroke of the anti-vibration electromagnetic driving unit 25 is less than 120 um, the interference level is less than 5%. That is the anti-vibration electromagnetic driving unit 25 can operate normally if the OIS stroke is within a specific range.

Embodiments of the camera module sufficiently address the problem due to magnetic field interference while keeping the light guiding holes at a relatively short pitch. As a result, the duration of an exposure for producing 3D images using the camera module can be increased, and the image quality in dim surroundings is improved. In addition, since the light for 3D photography enters the image-capturing module via the light guiding holes which have a relatively short pitch, the processing time is reduced and the image quality of the 3D photography is improved accordingly.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A camera module, comprising:
   a plurality of camera assemblies, wherein each of the camera assemblies is configured to receive and detect light passing through at least one of light guiding holes and comprises:
   a lens unit;
   an electromagnetic driving unit, comprising at least one magnetic element for controlling the movement of the lens unit; and
   a light guiding assembly, arranged to be adjacent to a first of the camera assemblies and configured to guide the light, passing through the light guiding hole to which the first of the camera assemblies is arranged to correspond, to the first of the camera assemblies, wherein the light guiding assembly comprises:
   a light path control unit, pivotable about a rotation axis so as to guide the light passing through a first and a second of the light guiding holes, which are arranged to be facing one another, to the first of the camera assemblies; and
   a switching unit, comprising a magnetic element configured to control a rotation angle of the light path control unit,
   wherein a distance between the magnetic element of the switching unit and the magnetic element of a second of the camera assemblies is greater than a distance between the first of the light guiding holes corresponding to the first of the camera assemblies and a third of the light guiding holes corresponding to the second of the camera assemblies;
   wherein the distance between two of the magnetic elements, which are closest to each other and respectively positioned in a first and a second of the camera assemblies, is greater than the distance between two of the centers of the light through holes, to which the first and the second of the camera assemblies are arranged to correspond.

2. The camera module as claimed in claim 1, wherein the first and the second of the camera assemblies are respectively configured to receive and detect light passing through two light guiding holes.

3. The camera module as claimed in claim 2, wherein the first of the camera assemblies comprises an OIS (Optical Image Stabilizer) adapter for controlling the movement of the lens unit in the first of the camera assemblies along a direction perpendicular to an optical axis thereof; and the second of the camera assemblies comprises a VCM (voice coil motor) for controlling the movement of the lens unit in the second of the camera assemblies along an optical axis thereof.

4. The camera module as claimed in claim 3, wherein the first and the second of the camera assemblies each comprises an optical sensor, and a plane on which the optical sensor of the first of the camera assemblies is located is perpendicular to a plane on which the optical sensor of the second of the camera assemblies is located.

5. The camera module as claimed in claim 2, wherein the first of the camera assemblies comprises an OIS adapter for controlling the movement of the lens unit in the first of the camera assemblies along a direction perpendicular to an optical axis thereof; and the second of the camera assemblies comprises an OIS adapter for controlling the movement of the lens unit in the second of the camera assemblies along a direction perpendicular to an optical axis thereof.

6. The camera module as claimed in claim 5, wherein the first and the second of the camera assemblies each comprises an optical sensor, and a plane on which the optical sensor of the first of the camera assemblies is located is parallel to a plane on which the optical sensor of the second of the camera assemblies is located.

7. The camera module as claimed in claim 1, wherein each of the magnetic elements is selected from a magnet or a yoke.

8. The camera module as claimed in claim 1, wherein the light guiding assembly is selected from a group consisting of a prism, a reflective mirror, and a refraction mirror.

* * * * *